United States Patent
Shibata et al.

(10) Patent No.: US 11,804,897 B2
(45) Date of Patent: Oct. 31, 2023

(54) MULTIPLEX TRANSMISSION SYSTEM AND MULTIPLEX TRANSMISSION METHOD

(71) Applicant: NIPPON TELEGRAPH AND TELEPHONE CORPORATION, Tokyo (JP)

(72) Inventors: Naotaka Shibata, Musashino (JP); Keita Takahashi, Musashino (JP); Tatsuya Fukui, Musashino (JP); Hideaki Kimura, Musashino (JP); Hirofumi Yamamoto, Musashino (JP); Noriyuki Ota, Musashino (JP); Jun Terada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 210 days.

(21) Appl. No.: 17/602,954

(22) PCT Filed: Mar. 26, 2020

(86) PCT No.: PCT/JP2020/013842
§ 371 (c)(1),
(2) Date: Oct. 11, 2021

(87) PCT Pub. No.: WO2020/209095
PCT Pub. Date: Oct. 15, 2020

(65) Prior Publication Data
US 2022/0200702 A1 Jun. 23, 2022

(30) Foreign Application Priority Data
Apr. 12, 2019 (JP) ................................ 2019-076429

(51) Int. Cl.
*H04B 10/112* (2013.01)
*H04B 10/272* (2013.01)
(Continued)

(52) U.S. Cl.
CPC ....... *H04B 10/1129* (2013.01); *H04B 10/272* (2013.01); *H04J 14/02* (2013.01); *H04W 72/0453* (2013.01); *H04W 72/23* (2023.01)

(58) Field of Classification Search
CPC .............. H04B 10/1129; H04B 10/272; H04B 10/25752; H04J 14/02; H04J 1/00; H04W 72/0453; H04W 72/23; H04W 92/12
(Continued)

(56) References Cited

U.S. PATENT DOCUMENTS 7,826,850 B2 * 11/2010 Matoba ............... H04W 72/543
455/452.2
8,391,247 B2 * 3/2013 Nomoto ................ H04W 88/08
370/334

(Continued)

FOREIGN PATENT DOCUMENTS

JP 5876941 B2 3/2016

OTHER PUBLICATIONS

Radio wave allocation destination, automatic change in minutes 5G Ministry of Internal Affairs and Communications, Nihon Keizai Shimbun, Oct. 10, 2018, https://www.nikkei.com/article/DGXMZO36313720Q8A011C1MM8000.
(Continued)

*Primary Examiner* — Abbas H Alagheband
(74) *Attorney, Agent, or Firm* — Harness, Dickey & Pierce, P.L.C.

(57) ABSTRACT

An uplink transmission band and a downlink transmission band that are allocated to each of a plurality of users are determined based on allocation information indicating allocation of a frequency bandwidth available to each of the plurality of users, and are output as uplink transmission band allocation information and downlink transmission band allocation information, respectively. Based on the downlink
(Continued)

transmission band allocation information, downlink signals output from a plurality of wireless control devices toward a plurality of wireless devices for each of the plurality of users, and the uplink transmission band allocation information are multiplexed, and the multiplexed signal is demultiplexed into downlink signals for each of the plurality of users and the uplink transmission band allocation information. Based on the demultiplexed uplink transmission band allocation information, the uplink transmission band allocated to each of the plurality of users is changed, and uplink signals output from the plurality of wireless devices toward the plurality of wireless control devices for each of the plurality of users are multiplexed according to the changed uplink transmission band and then, the multiplexed signal is demultiplexed into the uplink signals for each of the plurality of users.

5 Claims, 8 Drawing Sheets

(51) Int. Cl.
*H04J 14/02* (2006.01)
*H04W 72/0453* (2023.01)
*H04W 72/23* (2023.01)

(58) Field of Classification Search
USPC .......................................................... 398/72
See application file for complete search history.

(56) References Cited

U.S. PATENT DOCUMENTS

| | | | |
|---|---|---|---|
| 2010/0085911 A1* | 4/2010 | Nomoto | H04B 1/18 370/328 |
| 2015/0311980 A1* | 10/2015 | Kuwano | H04B 10/25752 398/58 |
| 2016/0112134 A1* | 4/2016 | Masunaga | H04B 10/25753 398/115 |
| 2016/0204869 A1* | 7/2016 | Nishihara | H04B 10/516 398/43 |

OTHER PUBLICATIONS

Japan Mobile Communications Infrastructure Association, We are constructing relay equipment for mobile phone services to road tunnels, railway tunnels, medical institutions nationwide, to subways and underground malls in metropolitan areas., literature, Feb. 27, 2019 (Reading Day), http://www.jmcia.or.jp/business/.

* cited by examiner

MULTIPLEX TRANSMISSION SYSTEM AND MULTIPLEX TRANSMISSION METHOD

CROSS-REFERENCE TO RELATED APPLICATIONS

This application is a 371 U.S. National Phase of International Application No. PCT/JP2020/013842 filed on Mar. 26, 2020, which claims priority to Japanese Application No. 2019-076429 filed on Apr. 12, 2019. The entire disclosures of the above applications are incorporated herein by reference.

TECHNICAL FIELD

The present invention relates to a multiplex transmission system and a multiplex transmission method.

BACKGROUND ART

A cellular system can have a configuration in which a base station is disposed so as to be separated into a wireless control device and a wireless device. In this case, the wireless control device is connected to the wireless device via an optical section having an optical device and optical fiber. The optical section including the optical device and optical fiber is referred to as Mobile Fronthaul (MFH).

There may be a plurality of users (hereinafter referred to as operators) operating the cellular system. In addition, when the operators individually construct an MFH, the optical devices and optical fiber are required for each of the operators. Thus, when the wireless devices and the wireless control devices that are installed by the operators are located close to one another, the MFH can be efficiently constructed by installing a shared optical device and shared optical fiber and by receiving signals of the multiple operators through the shared optical device and shared optical fiber.

In this case, it is conceivable to perform wavelength-multiplexing and time-multiplexing of the signals of the plurality of operators. In the case of only performing wavelength multiplexing, the operators use individual wavelengths. However, in addition to wavelength multiplexing, time multiplexing may be adopted to share one wavelength among the operators, thereby decreasing the number of required wavelengths, which is economical.

In recent years, frequency resources suitable for wireless communication have become scarce. On the other hand, all of the frequency bandwidth allocated for wireless communication is not always utilized, and the usage status of the frequency bandwidth changes with location, time, and operator.

Therefore, it has been considered beneficial to share frequency resources among multiple operators, and dynamically change the allocation of the frequency bandwidth to each operator in accordance with the usage status. For example, one frequency resource can be effectively utilized by allocating more frequency bandwidth to an operator with higher traffic and allocating less frequency bandwidth to an operator with lower traffic.

Hereinafter, it is given that the number of operators is n, the frequency bandwidth of the frequency resource shared among all operators is B, and the frequency bandwidth allocated to each operator is $x_i$ ($1 \leq i \leq n$). For systems widely deployed throughout the country, such as cellular systems, it is thought that multiple operators offer services at the same time and location. However, in order for multiple operators to use the same frequency band, many antennas are needed for spatial isolation, which is difficult to implement.

Thus, since it is assumed that multiple operators use different frequency bands to offer services at the same time and location, the following equation holds: $x_1+x_2+ \ldots +x_n=B$ ($0 \leq x_i \leq B$, $1 \leq i \leq n$). Here, given that the band (MFH band) required for the MFH by an ith operator is $f_i(x_i)$, the total MFH band required by all operators is $f_1(x_1)+f_2(x_2)+ \ldots f_n(x_n)$. Since the MFH band becomes larger as the frequency bandwidth becomes wider, $f_i(x_i)$ ($1 \leq i \leq n$) is a monotonically increasing function.

$f_i$ depends on the interface between the wireless device and the wireless control device, the spectral efficiency between the wireless device and the wireless terminal, and the like. Hereinafter, a split D of an enhanced common public radio interface (eCPRI) is described as an example of the interface between the wireless device and the wireless control device.

Given that the frequency bandwidth is 20 MHz, the spatial multiplexing number is 2, and the modulation multilevel number is 256 QAM without consideration of the control signal, the MFH band is about 270 Mbps and the MFH band is a linear function that is proportional to the frequency bandwidth and spectral efficiency.

For example, suppose that the maximum modulation scheme used by a first operator in wireless communication is 256 QAM and the maximum modulation scheme used by a second operator in wireless communication is 64 QAM. In this case, $f_1(x_a)$ is approximately ⅘ times $f_2(x_a)$ ($0 \leq x \leq B$). In addition, when the number of antennas and the maximum spatial multiplexing number that are used by the first operator in wireless communication are 8, and the number of antennas and the maximum spatial multiplexing number that are used by the second operator in wireless communication are 4, $f_1(x_a)$ is considered to be approximately twice $f_2(x_a)$. On the contrary, when the first operator and the second operator use the same conditions such as spectral efficiency and spatial multiplexing number in wireless communication, $f_1(x_a)$ and $f_2(x_a)$ are considered to be substantially the same.

An example of the configuration of a multiplex transmission system 1 is illustrated in FIG. 8. As illustrated in FIG. 8, the multiplex transmission system 1 has, for example, wireless devices 2-1 to 2-3 of three operators, wireless control devices 3-1 to 3-3 of three operators, multiplex transmission devices 4-1,4-2 shared among the operators, and an allocation determination device 5. Note that, in the case where any of a plurality of configurations such as the wireless devices 2-1 to 2-3 are not to be distinguished from one another, these are abbreviated, for example, as the wireless device 2.

The wireless devices 2-1 to 2-3 are devices arranged for the respective operators to wirelessly communicate with wireless terminals. The wireless control devices 3-1 to 3-3 are devices arranged for the respective operators to control wireless communication based on their allocated frequency bandwidths. The allocation determination device 5 determines the frequency bandwidth allocated to each of the operators and notifies each of the operators (e.g., the wireless control devices 3-1 to 3-3) of the allocated frequency bandwidth.

The multiplex transmission devices 4-1, 4-2 are devices shared among the operators for the operators to perform communication between the wireless devices 2-1 to 2-3 and the wireless control devices 3-1 to 3-3.

The multiplex transmission device 4-1 includes a communication unit 4-1a, a multiplexing unit 4-1b, and a demultiplexing unit 4-1c. The communication unit 4-1a performs, for example, electrical/optical conversion to perform bi-directional communication with the multiplex transmission device 4-2. Here, when the required MFH band is less than the transmission capacity of one wavelength, the communication unit 4-1a can perform transmission at one wavelength. In addition, when the required MFH band is larger than the transmission capacity of one wavelength, the communication unit 4-1a uses multiple wavelengths. Note that the multiplex transmission device 4-1 may perform not only electrical/optical conversion processing but also frame conversion, FEC processing, encryption, and the like.

The multiplexing unit 4-1b allocates signals to be transmitted at the same wavelength among signals received from the wireless control devices 3-1 to 3-3 to a predetermined time band, time-multiplexes the signals, and outputs the multiplexed signal to the communication unit 4-1a.

The demultiplexing unit 4-1c time-demultiplexes the signal input from the multiplex transmission device 4-2 via the communication unit 4-1a for each wavelength, and outputs the demultiplexed signals to the wireless control devices 3-1 to 3-3. The demultiplexing unit 4-1c may be formed integrally with the multiplexing unit 4-1b.

The multiplex transmission device 4-2 includes a communication unit 4-2a, a multiplexing unit 4-2b, and a demultiplexing unit 4-2c. The communication unit 4-2a performs, for example, electrical/optical conversion to perform bi-directional communication with the multiplex transmission device 4-1. Here, when the required MFH band is less than the transmission capacity of one wavelength, the communication unit 4-2a can perform transmission at one wavelength. In addition, when the required MFH band is larger than the transmission capacity of one wavelength, the communication unit 4-2a uses multiple wavelengths. Note that the multiplex transmission device 4-2 may perform not only electrical/optical conversion processing but also frame conversion, FEC processing, encryption, and the like.

The multiplexing unit 4-2b allocates signals to be transmitted at the same wavelength among signals received from the wireless devices 2-1 to 2-3 to a predetermined time band and time-multiplexes the signals, and outputs the time-multiplexed signal to the communication unit 4-2a.

The demultiplexing unit 4-2c time-demultiplexes the signal input from the multiplex transmission device 4-1 via the communication unit 4-2a for each wavelength, and outputs the demultiplexed signals to the wireless devices 2-1 to 2-3. The demultiplexing unit 4-2c may be formed integrally with the multiplexing unit 4-2b.

Note that uplink signals and downlink signals may be multiplexed by wavelength multiplexing and transmitted in one optical cable, or may be transmitted in two optical cables without being wavelength-multiplexed. However, the two methods are similar in that physically different resources are used for the uplink signals and downlink signals. The MFH band is defined as a maximum band required for MFH by each operator.

In addition, when the interface between the wireless devices 2-1 to 2-3 and the wireless control devices 3-1 to 3-3 is CPRI, the band required for the MFH is fixed. When the interface between the wireless devices 2-1 to 2-3 and the wireless control devices 3-1 to 3-3 is eCPRI, the band required for the MFH can vary depending on the number of wireless terminals and the wireless environment. However, this variation depends on the scheduling cycle of the wireless control devices 3-1 to 3-3 and varies with a very short cycle of approximately 1 ms and thus, band allocation following the cycle is not considered.

CITATION LIST

Patent Literature

Patent Literature 1: JP 5876941 B

Non Patent Literature

Non Patent Literature 1: Automatically Change Radio Allocation Destination in Minutes for 5G, the Ministry of Public Management, Home Affairs, Posts and Telecommunications, [online], 2018 Oct. 10, Nihon Keizai Shinbun, [searched on 2019 Feb. 27], Internet <URL: https://www.nikkei.com/article/DGXMZO36313720Q8A011C1MM8000/> Non Patent Literature 2: Relay Facilities for Mobile Phone Services under Construction in Road Tunnels, Railway Tunnels, and Medical Institutions Nationwide, and in Subways and Underground Shopping Malls in Metropolitan Areas. [online], Japan Mobile Communications Infrastructure Association, [searched on 2019 Feb. 27], Internet: <URL: http://www.jmcia.or.jp/business/>

SUMMARY OF THE INVENTION

Technical Problem

According to the related art, the multiplexing units 4-1b, 4-2b and the demultiplexing units 4-1c, 4-2c may divide a transmission band sufficiently to transfer the MFH band of each operator. Here, when one frequency resource is shared among multiple operators, the frequency bandwidth used by each operator varies and the MFH band also varies in the range of $0 \le f_1(x_1) \le f_1(B)$, $0 \le f_2(x_2) \le f_2(B)$, $0 \le f_3(x_3) \le f_3(B)$.

According to the related art of fixedly allocating a time band to each operator, it is necessary to allocate the maximum MFH band to each operator, for example, $f_1(B)$ to an operator #1, $f_2(B)$ to an operator #2, and $f_3(B)$ to an operator #3. As a result, the required MFH band increases, which is inefficient. However, since there is no mechanism for the multiplex transmission devices 4-1, 4-2 to recognize the variation in frequency allocation, it is not possible to dynamically allocate the MFH band to each operator.

An object of the present invention is to provide a multiplex transmission system and a multiplex transmission method that can efficiently utilize an MFH band.

Means for Solving the Problem

A multiplex transmission system according to an aspect of the present invention is a multiplex transmission system for multiplexing signals between a plurality of wireless devices configured to wirelessly communicate with wireless terminals with an available frequency bandwidth allocated to each of a plurality of users in a common frequency band with a plurality of wireless control devices that control the plurality of wireless devices for each of the plurality of users, and transmitting the multiplexed signal, the multiplex transmission system including a band allocation determination unit configured to determine, based on allocation information indicating allocation of the frequency bandwidth available to each of the plurality of users, an uplink transmission band and a downlink transmission band to be allocated to each of the plurality of users, and output the uplink transmission band and the downlink transmission band as uplink transmission band allocation information and downlink transmission band allocation information, respectively; a first multiplexing unit configured to multiplex, based on the downlink transmission band allocation information, downlink signals and the uplink transmission band allocation information, the downlink signals being output from the plurality of wireless control devices toward the plurality of wireless devices for each of the plurality of users; a first communication unit configured to transmit the signal multiplexed by the first multiplexing unit toward the plurality of wireless devices and receive a multiplexed signal obtained by multiplexing signals output from the plurality of wireless devices toward the wireless control devices; a first demultiplexing unit configured to demultiplex the multiplexed signal received by the first communication unit into uplink signals for each of the plurality of users; a second communication unit configured to receive the multiplexed signal transmitted by the first communication unit and transmit the multiplexed signal output from the plurality of wireless devices toward the plurality of wireless control devices; a second demultiplexing unit configured to demultiplex the multiplexed signals received by the second communication unit into the downlink signals for each of the plurality of users and the uplink transmission band allocation information; a band allocation change unit configured to change, based on the uplink transmission band allocation information demultiplexed by the second demultiplexing unit, the uplink transmission band allocated to each of the plurality of users; and a second multiplexing unit configured to multiplex the uplink signals output from the plurality of wireless devices toward the plurality of wireless control devices for each of the plurality of users according to the uplink transmission band changed by the band allocation change unit.

Further, in a multiplex transmission system according to the aspect of the present invention, the first multiplexing unit and the second multiplexing unit may be configured to multiplex signals by at least one of time multiplexing or wavelength multiplexing.

Further, in a multiplex transmission system according to the aspect of the present invention, the second communication unit, the second demultiplexing unit, the second multiplexing unit, and the band allocation change unit may be provided for each of the plurality of users, and the plurality of second communication units may be configured to communicate with the first communication unit via PON.

A multiplex transmission system according to the aspect of the present invention may further include a traffic collection unit configured to collect traffic of uplink signals and downlink signals for each user; and an allocation change request unit configured to request an allocation determination device to change the frequency bandwidth allocated to each of the plurality of users, the allocation determination device being configured to determine, based on the traffic collected by the traffic collection unit, the available frequency bandwidth allocated to each of the plurality of users, in which the band allocation determination unit may be configured to determine, based on allocation information changed in response to the request from the allocation change request unit, the uplink transmission band and the downlink transmission band.

A multiplex transmission method according to another aspect of the present invention is a multiplex transmission method for multiplexing signals between a plurality of wireless devices configured to wirelessly communicate with wireless terminals with an available frequency bandwidth allocated to each of a plurality of users in a common frequency band with a plurality of wireless control devices that control the plurality of wireless devices for each of the plurality of users, and transmitting the multiplexed signal, the method including band application determining of, based on allocation information indicating allocation of the frequency bandwidth available to each of the plurality of users, determining an uplink transmission band and a downlink transmission band to be allocated to each of the plurality of users, and outputting the uplink transmission band and the downlink transmission band as uplink transmission band allocation information and downlink transmission band allocation information, respectively; first multiplexing of, based on the downlink transmission band allocation information, multiplexing downlink signals and the uplink transmission band allocation information, the downlink signals being output from the plurality of wireless control devices toward the plurality of wireless devices for each of the plurality of users; first demultiplexing of demultiplexing the signal multiplexed in the first multiplexing into downlink signals for each of the plurality of users and the uplink transmission band allocation information; band allocation changing of, based on the uplink transmission band allocation information demultiplexed in the first demultiplexing, changing the uplink transmission band allocated to each of the plurality of users; second multiplexing of multiplexing the uplink signals output from the plurality of wireless devices toward the plurality of wireless control devices for each of the plurality of users according to the changed uplink transmission band; and second demultiplexing of demultiplexing the signal multiplexed into uplink signals for each of the plurality of users in the second multiplexing.

Effects of the Invention

According to the present invention, an MFH band can be efficiently utilized.

DESCRIPTION OF EMBODIMENTS

Figure 1:
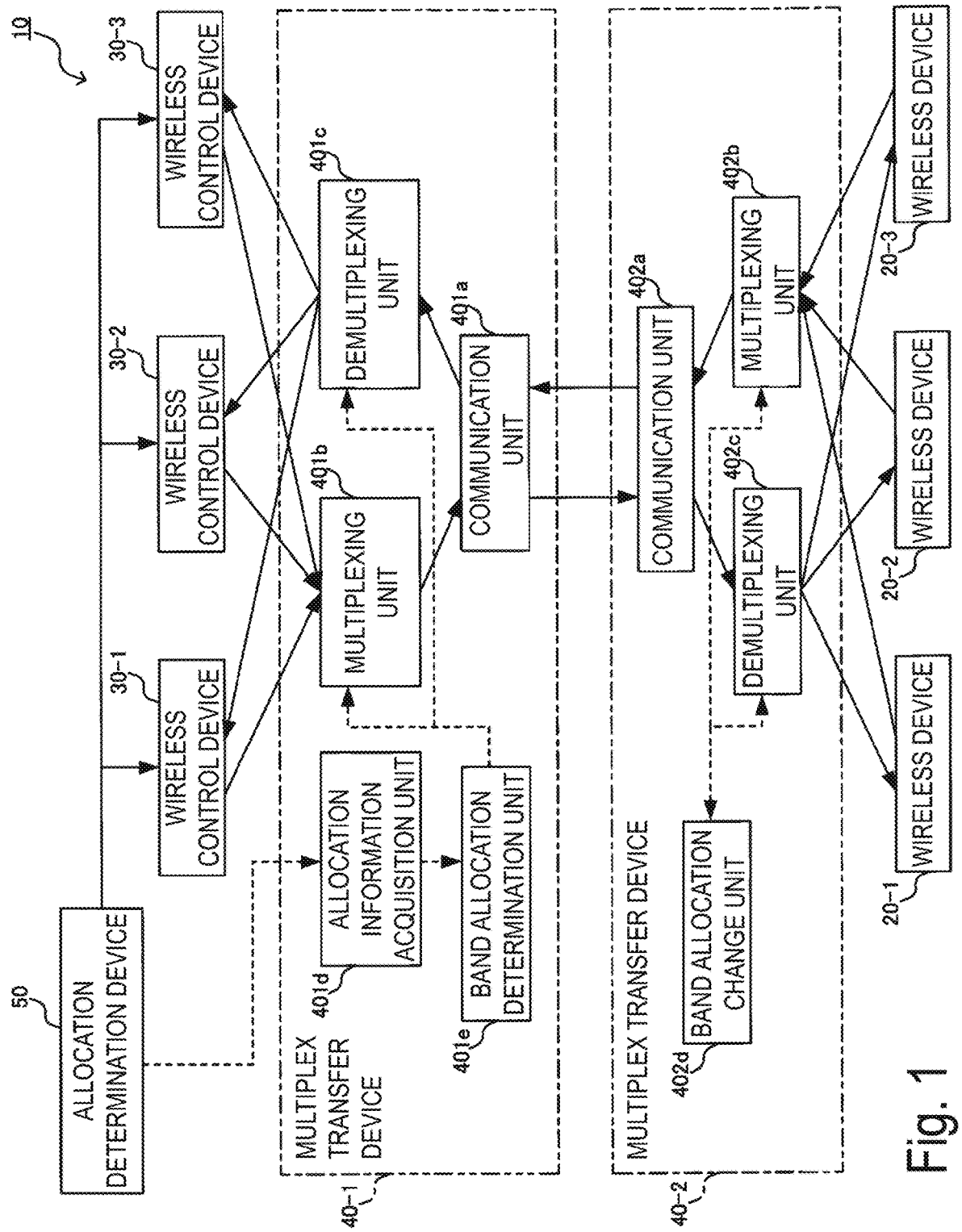
FIG. 1 is a diagram illustrating a configuration example of a multiplex transmission system according to a first embodiment.

Hereinafter, a first embodiment of a wireless multiplex transmission system is described with reference to the drawings. FIG. 1 illustrates a configuration example of a multiplex transmission system 10 according to the first embodiment. As illustrated in FIG. 1, the multiplex transmission system 10 has, for example, wireless devices 20-1 to 20-3 of three operators (operators #1 to #3), wireless control devices 30-1 to 30-3 of the three operators, multiplex transmission devices 40-1, 40-2 shared among the operators, and an allocation determination device 50. Note that the number of operators is not limited to three.

The multiplex transmission system 10 multiplexes signals between the wireless devices 20-1 to 20-3 that wirelessly communicate with wireless terminals by allocating an available frequency bandwidth to each of a plurality of users in a common frequency band and the wireless control devices 30-1 to 30-3 that control the wireless devices 20-1 to 20-3 for each user, and transmits the multiplexed signal.

For example, the wireless devices 20-1 to 20-3 are devices arranged for the operators to wirelessly communicate with wireless terminals. The wireless control devices 30-1 to 30-3 are devices arranged for the corresponding operators to control wireless communication based on the allocated frequency bandwidth.

The allocation determination device 50 determines the frequency bandwidth allocated to each operator as allocation information, and notifies each operator (e.g., the wireless control devices 30-1 to 30-3) and the multiplex transmission device 40-1 of the allocation information. The cycle at which the allocation determination device 50 determines the allocation information may be set to any time.

The multiplex transmission devices 40-1, 40-2 are devices that are shared among the operators and that enable the operators to perform communication between the wireless devices 20-1 to 20-3 and the wireless control devices 30-1 to 30-3, respectively.

The multiplex transmission device 40-1 includes a communication unit 401a, a multiplexing unit 401b, a demultiplexing unit 401c, an allocation information acquisition unit 401d, and a band allocation determination unit 401e.

The communication unit 401a performs, for example, electrical/optical conversion to perform bi-directional communication with the multiplex transmission device 40-2. Specifically, the communication unit 401a transmits a signal input from the multiplexing unit 401b to the multiplex transmission device 40-2, and outputs the signal received from the multiplex transmission device 40-2 to the demultiplexing unit 401c.

Here, when the required MFH band is less than the transmission capacity of one wavelength, the communication unit 401a can perform transmission at one wavelength. In addition, when the required MFH band is larger than the transmission capacity of one wavelength, the communication unit 401a uses multiple wavelengths. Note that the multiplex transmission device 40-1 may perform not only electrical/optical conversion processing but also frame conversion, FEC processing, encryption, and the like.

The allocation information acquisition unit 401d acquires the allocation information indicating the frequency bandwidth allocated to each operator from the allocation determination device 50, and outputs the obtained allocation information to the band allocation determination unit 401e.

Based on the allocation information input from the allocation information acquisition unit 401d, the band allocation determination unit 401e determines transmission band allocation information including the allocation of an uplink communication transmission band (uplink transmission band allocation information) and the allocation of a downlink communication transmission band (downlink transmission band allocation information) for each operator. Then, the band allocation determination unit 401e outputs the transmission band allocation information for each operator to the multiplexing unit 401b, and outputs the uplink transmission band allocation information for each operator to the demultiplexing unit 401c.

Based on the downlink transmission band allocation information, the multiplexing unit 401b allocates signals to be transmitted at the same wavelength among signals received from the wireless control devices 30-1 to 30-3 to a predetermined time band, time-multiplexes the signals, and outputs the time-multiplexed signal to the communication unit 401a. Based on the downlink transmission band allocation information, the multiplexing unit 401b also multiplexes the transmission band allocation information at the same time, and outputs the multiplexed transmission band allocation information to the communication unit 401a. In other words, based on the downlink transmission band allocation information, the multiplexing unit 401b multiplexes the downlink signals for each user which are output from the wireless control devices 30-1 to 30-3 toward the wireless devices 20-1 to 20-3, and the transmission band allocation information. Note that the multiplexing unit 401b may be configured to multiplex signals by at least one of time multiplexing or wavelength multiplexing.

For example, based on the uplink transmission band allocation information, the demultiplexing unit 401c time-demultiplexes the signal input from the multiplex transmission device 40-2 via the communication unit 401a for each wavelength, and outputs the demultiplexed signals to the wireless control devices 30-1 to 30-3. For example, the demultiplexing unit 401c demultiplexes below-mentioned multiplexed signals received by the communication unit 401a into uplink signals for each user. The demultiplexing unit 401c may be formed integrally with the multiplexing unit 401b.

The multiplex transmission device 40-2 includes a communication unit 402a, a multiplexing unit 402b, a demultiplexing unit 402c, and a band allocation change unit 402d.

The communication unit 402a performs, for example, electrical/optical conversion to perform bi-directional communication with the multiplex transmission device 401. Specifically, the communication unit 402a receives from the wireless control devices 30-1 to 30-3 a multiplexed signal transmitted by the multiplex transmission device 40-1, and transmission band allocation information (downlink transmission band allocation information and uplink transmission band allocation information). Then, the communication unit 402a outputs the signal from the wireless control devices 30-1 to 30-3 to the demultiplexing unit 402c. The communication unit 402a also transmits a signal input from the multiplexing unit 402b to the multiplex transmission device 40-1. In other words, the communication unit 402a receives the multiplexed signal transmitted by the communication unit 401a, and transmits the below-mentioned signal that is obtained by multiplexing signals output from the wireless devices 20-1 to 20-3 toward the wireless control devices 30-1 to 30-3.

Here, when the required MFH band is less than the transmission capacity of one wavelength, the communication unit 402a can perform transmission at one wavelength. In addition, when the required MFH band is larger than the transmission capacity of one wavelength, the communication unit 402a uses multiple wavelengths. Note that the multiplex transmission device 4-2 may perform not only electrical/optical conversion processing but also frame conversion, FEC processing, encryption, and the like.

Based on the uplink transmission band allocation information input from the demultiplexing unit 402c, the band allocation change unit 402d changes the uplink transmission band for each operator, and instructs the multiplexing unit 402b to change the uplink transmission band. Based on the downlink transmission band allocation information input from the demultiplexing unit 402c, the band allocation change unit 402d changes the downlink transmission band for each operator, and instructs the demultiplexing unit 402c to change the downlink transmission band.

The multiplexing unit 402b changes the uplink transmission band according to the uplink transmission band changed by the band allocation change unit 402d, allocates signals to be transmitted at the same wavelength among signals received from the wireless devices 20-1 to 20-3 to a predetermined time band and time-multiplexes the signals, and outputs the time-multiplexed signal to the communication unit 402a. Note that the multiplexing unit 402b may be configured to multiplex signals by at least one of time multiplexing or wavelength multiplexing.

The demultiplexing unit 402c changes the downlink transmission band allocation information according to an instruction from the band allocation change unit 402d, time-demultiplexes the signal input from the multiplex transmission device 40-1 via the communication unit 402a for each wavelength, and outputs the demultiplexed signals to the wireless devices 20-1 to 20-3. For example, the demultiplexing unit 402c demultiplexes the multiplexed signal received by the communication unit 402a into the downlink signals for each user and the transmission band allocation information. The demultiplexing unit 402c outputs the demultiplexed downlink signals for each user to the wireless devices 20-1 to 20-3. The demultiplexing unit 402c also outputs the uplink transmission band allocation information to the band allocation change unit 402d. The demultiplexing unit 402c may be formed integrally with the multiplexing unit 402b.

Next, specific operation examples of the multiplex transmission system 10 are described.

Figure 2:
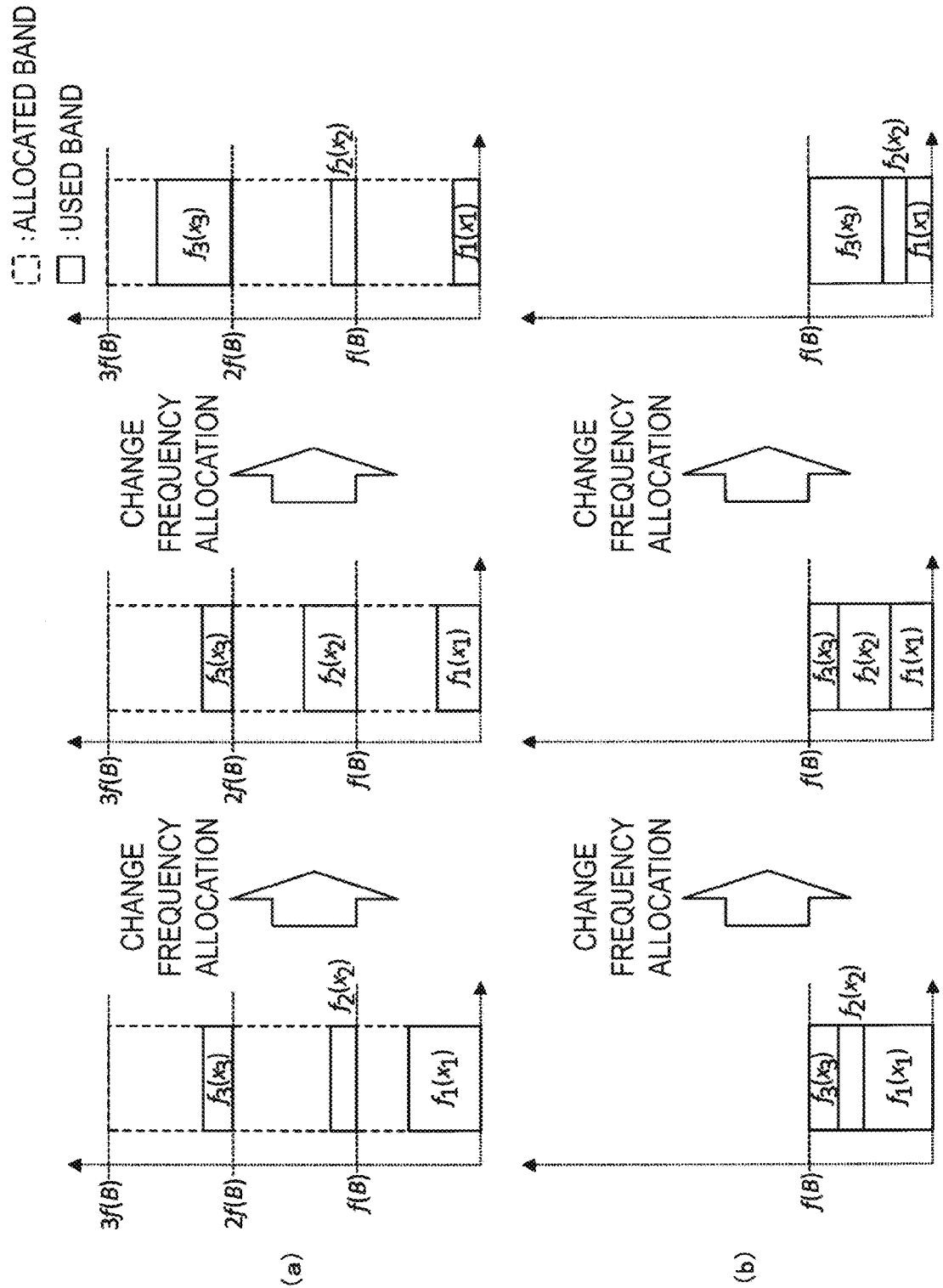
FIG. 2(a) is a diagram illustrating an operation example in the related art.
FIG. 2(b) is a diagram illustrating a first operation example of the multiplex transmission system.

In FIG. 2, a first operation example of the multiplex transmission system 10 is compared with the related art. FIG. 2(a) illustrates an operation example in the related art. FIG. 2(b) illustrates the first operation example of the multiplex transmission system 10. In the example illustrated in FIG. 2, $f_1$, $f_2$, and $f_3$ are linear functions and $f_1(x_a)=f_2(x_a)=f_3(x_a)=f(x_a)$, $(0 \leq x_a \leq B)$, $f(B)=f_1(x_1)+f_2(x_2)+f_3(x_3)$. Note that the transmission capacity per wavelength is 3f(B) or less.

In this case, according to the related art of fixedly allocating the transmission band, it is necessary to allocate a maximum f(B) to each operator, which requires 3f(B) in total. On the contrary, since the multiplex transmission system 10 changes the allocation of the transmission band based on the transmission band allocation information, the transmission band can be efficiently used, which requires f(B) in total.

Figure 3:
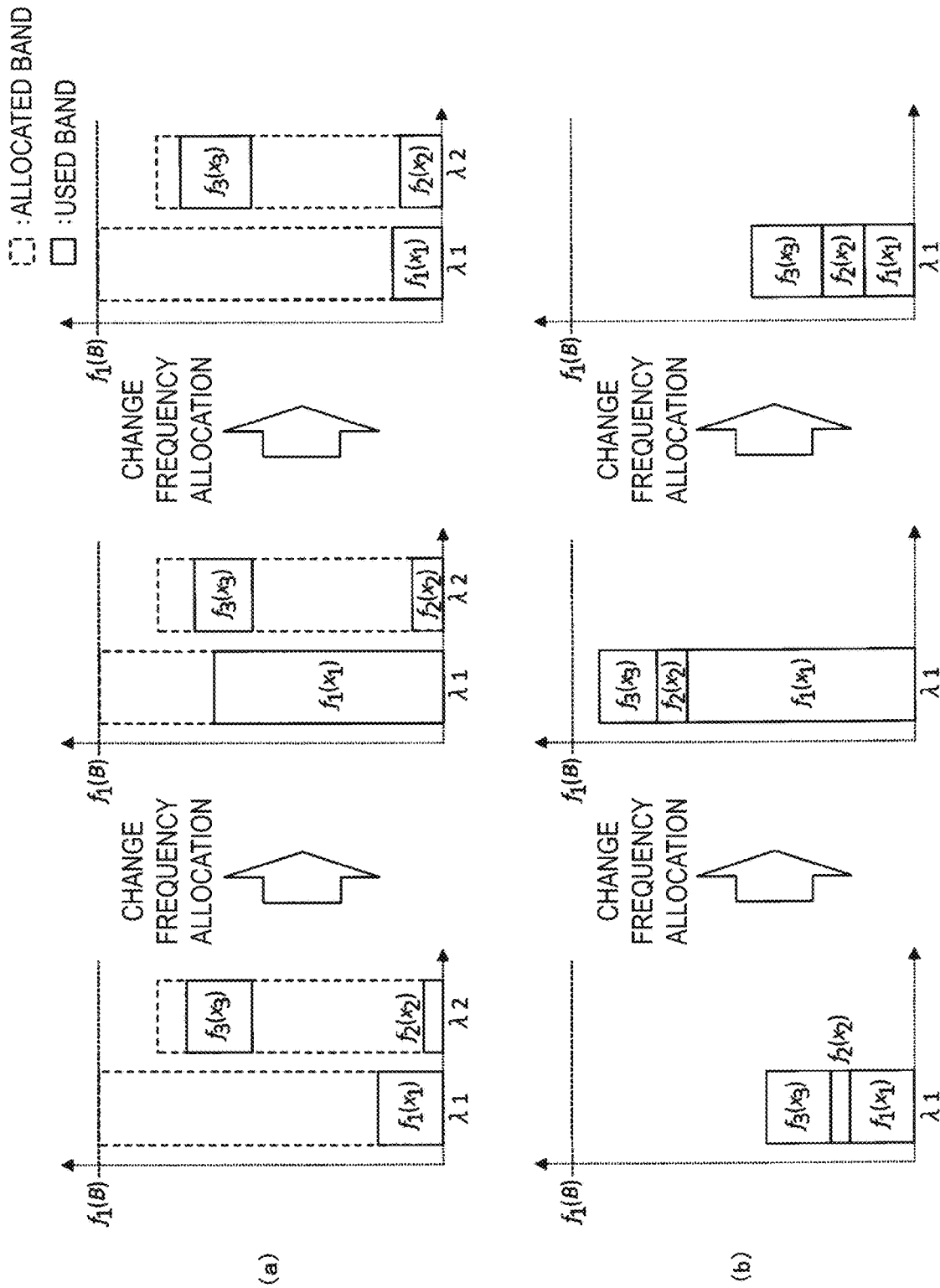
FIG. 3(a) is a diagram illustrating an operation example in the related art.
FIG. 3(b) is a diagram illustrating a second operation example of the multiplex transmission system.

In FIG. 3, the second operation example of the multiplex transmission system 10 is compared with the related art. FIG. 3(a) illustrates an example operation in the related art. FIG. 3(b) illustrates the second operation example of the multiplex transmission system 10. In the example illustrated in FIG. 3, $f_1$, $f_2$, and $f_3$ are linear functions and $f_1(x_a)>f_2(x_a)>f_3(x_a)$, $f_1(B)>f_2(B)+f_3(B)$, $(0 \leq x_a \leq B)$, $f_1(B) \geq f_1(x_1)+f_2(x_2)+f_3(x_3)$. Note that the transmission capacity per wavelength is $f_1(B)$.

In this case, two wavelengths in total are required in the related art. On the contrary, the multiplex transmission system 10 changes the allocation of the transmission band based on transmission band allocation information. Specifically, the total required MFH band $f_1(x_1)+f_2(x_2)+f_3(x_3)$ becomes maximum when all the frequency bandwidth is allocated to the operator #1, and since the value is $f_1(B)$, one wavelength is required in total.

Figure 4:
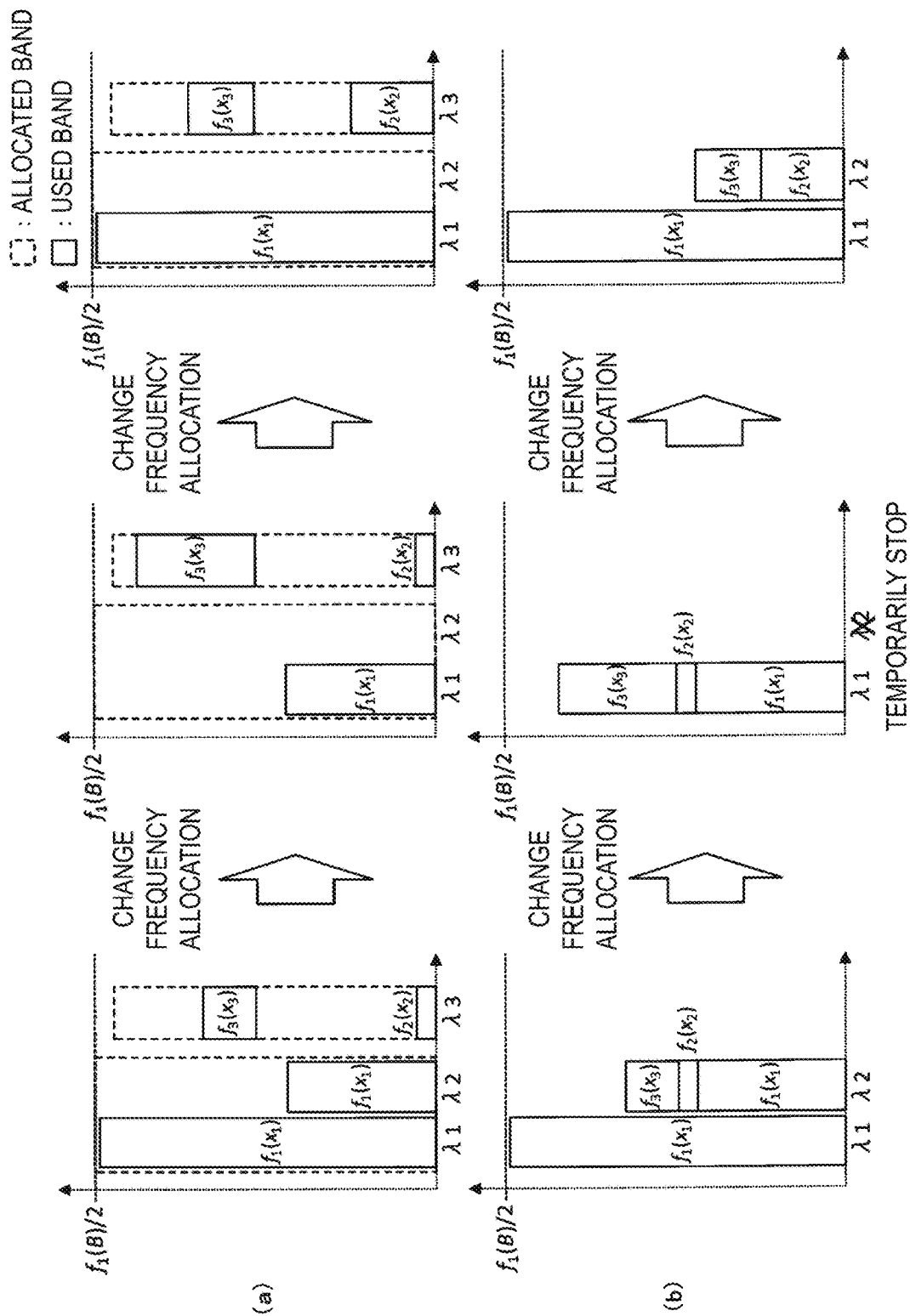
FIG. 4(a) is a diagram illustrating an operation example in the related art.
FIG. 4(b) is a diagram illustrating a third operation example of the multiplex transmission system.

In FIG. 4, a third operation example of the multiplex transmission system 10 is compared with the related art. FIG. 4(a) illustrates an example operation in the related art. FIG. 4(b) illustrates the third operation example of the multiplex transmission system 10. In the example illustrated in FIG. 4, $f_1$, $f_2$, and $f_3$ are linear functions and $f_1(x_a)>f_2(x_a)>f_3(x_a)$, $f_1(B)/2>f_2(B)+f_3(B)$, $(0 \leq x_a \leq B)$, $f_1(B) \geq f_1(x_1)+f_2(x_2)+f_3(x_3)$. Note that the transmission capacity per wavelength is $f_1(B)/2$.

In this case, three wavelengths in total are required in the related art. On the contrary, the multiplex transmission system 10 changes the allocation of the transmission band based on transmission band allocation information. Specifically, the total required MFH band $f_1(x_1)+f_2(x_2)+f_3(x_3)$ becomes maximum when all the frequency bandwidth is allocated to the operator #1, and since the value is $f_1(B)$, two wavelengths are required in total.

On the other hand, when the frequency bandwidth allocated to the operator #1 is small, because $f_1(x_1)+f_2(x_2)+f_3(x_3)<f_1(B)/2$, transmission may be made at one wavelength. In this case, wavelengths that are not used for transmission can be temporarily stopped, thereby saving power.

Next, other embodiments of the multiplex transmission system will be described.

Figure 5:
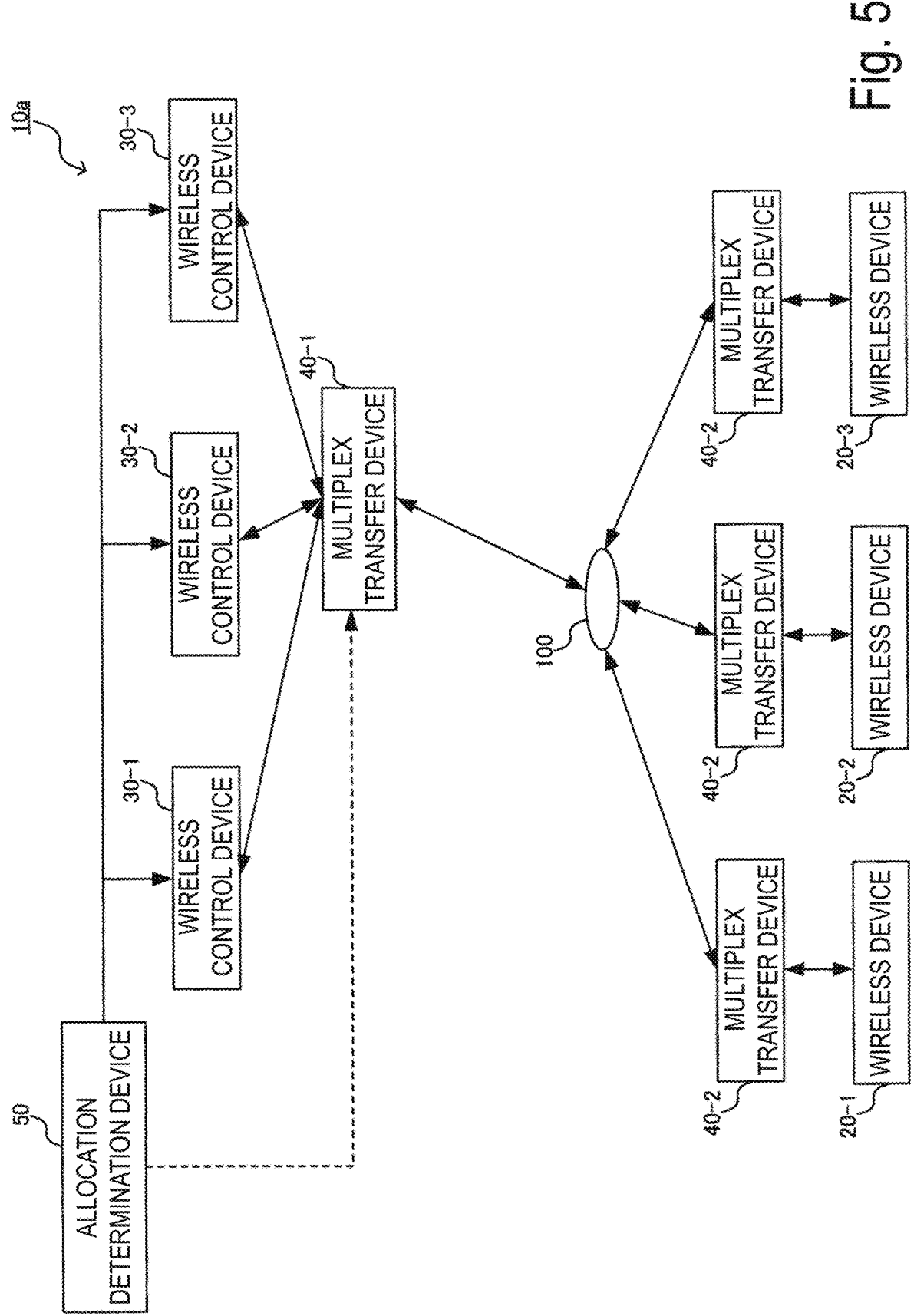
FIG. 5 is a diagram illustrating a configuration example of a multiplex transmission system according to a second embodiment.

FIG. 5 is a diagram illustrating a configuration example of a multiplex transmission system 10a according to a second embodiment. As illustrated in FIG. 5, the multiplex transmission system 10a has, for example, wireless devices 20-1 to 20-3 of three operators, wireless control devices 30-1 to 30-3 of three operators, a multiplex transmission device 40-1 shared among the operators, an allocation determination device 50, and three multiplex transmission devices 40-2 shared among the operators connected to an optical splitter 100. Note that components that are substantially the same as those of the multiplex transmission system 10 illustrated in FIG. 1 are denoted by the same reference numerals.

The multiplex transmission system 10a differs from the multiplex transmission system 10 illustrated in FIG. 1 in that the wireless devices 20-1 to 20-3 of the operators are separated from each other. More specifically, the multiplex transmission system 10a differs in that the multiplex transmission devices 40-2 are respectively arranged for the wireless devices 20-1 to 20-3, and that the wireless device 20 and the wireless control device 30 of each operator are connected to each other via a passive optical network (PON) configuration rather than P-to-P.

In other words, the multiplex transmission system 10a includes a communication unit 402a, a multiplexing unit 402b, a demultiplexing unit 402c, and a band allocation change unit 402d for each of a plurality of users, and the plurality of the communication units 402a communicate with the communication unit 401a via a PON.

In the related art, an approach of calculating an MFH band required for uplink in cooperation with a wireless control device and dynamically allocating the band in a PON has been studied (see Patent Document 1). This approach cannot calculate the required MFH band for downlink communication. Further, in the example described in Patent Document 1, for the multiplex transmission device to acquire the information of the wireless control device, a new interface needs to be provided on the wireless control device, and it is difficult to implement such an interface.

On the contrary, in the multiplex transmission system 10a, the multiplex transmission devices 40-1, 40-2 only acquire signals already exchanged between the allocation determination device 50 and the wireless control devices 30-1 to 30-3 at the defined interface. Thus, it is sufficient that the interface be implemented for the multiplex transmission devices 40-1, 40-2, and there is no need to implement a new interface for the allocation determination device 50 and the wireless control devices 30-1 to 30-3, which is simple.

Figure 6:
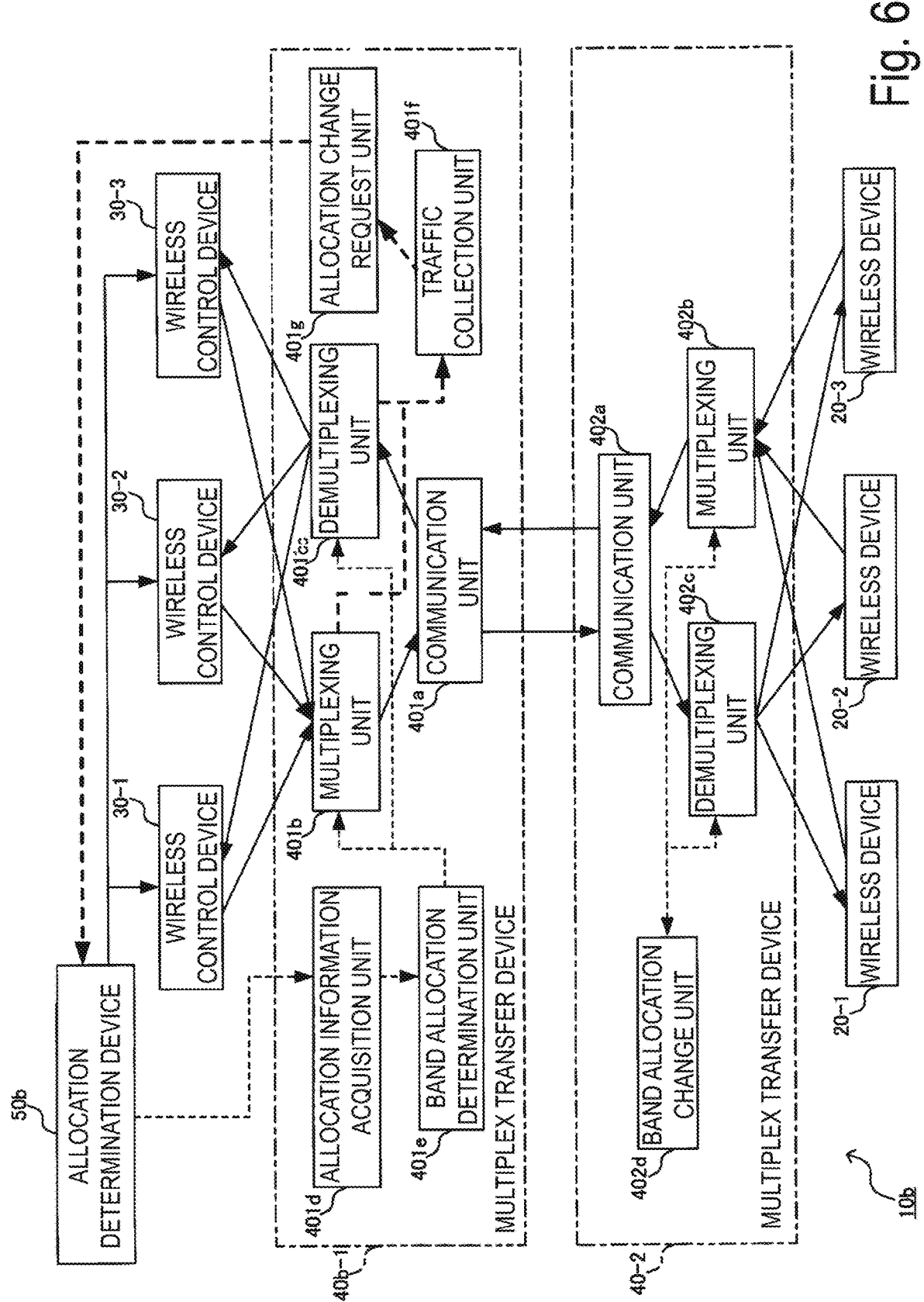
FIG. 6 is a diagram illustrating a configuration example of a multiplex transmission system according to a third embodiment.

FIG. 6 illustrates a configuration example of a multiplex transmission system 10b according to a third embodiment. As illustrated in FIG. 6, the multiplex transmission system 10b has, for example, wireless devices 20-1 to 20-3 of three operators, wireless control devices 30-1 to 30-3 of three operators, multiplex transmission devices 40b-1, 40-2 shared among the operators, and an allocation determination device 50b.

The multiplex transmission device 40b-1 includes a communication unit 401a, a multiplexing unit 401b, a demultiplexing unit 401c, an allocation information acquisition unit 401d, a band allocation determination unit 401e, a traffic collection unit 401f, and an allocation change request unit 401g.

The traffic collection unit 401f collects traffic information on uplink signals for each operator from the demultiplexing unit 401c, collects traffic information on downlink signals of each operator from the multiplexing unit 401b, and outputs the collected traffic information to the allocation change request unit 401g. The traffic information is a utilization rate of the allocated transmission band, and the like. Note that the collection cycle of the traffic information may be set at any time.

Based on the traffic information input from the traffic collection unit 401f, the allocation change request unit 401g outputs allocation change request information indicating a request to change the frequency bandwidth to be allocated to each user, to the allocation determination device 50b.

For example, when the utilization rate of the transmission band allocated to a certain operator exceeds a predetermined threshold, the allocation change request unit 401g increases the allocation of the frequency bandwidth for the operator, and outputs the allocation change request information indicating that increase to the allocation determination device 50b. At the same time, the allocation change request unit 401g decreases the allocation of the frequency bandwidth for all of the other operators or the operator having a lowest average or maximum value of the utilization rate, and outputs the allocation change request information indicating that decrease to the allocation determination device 50b.

Based on the allocation change request information input from the multiplex transmission device 40b-1, the allocation determination device 50b determines the frequency bandwidth allocated to each operator as allocation information, and notifies each operator (e.g., the wireless control devices 30-1 to 30-3) and the multiplex transmission device 40b-1 of the allocation information.

In other words, based on the allocation information changed by the allocation determination device 50b in response to the request from the allocation change request unit 401g, the band allocation determination unit 401e determines the transmission band allocation information (the downlink transmission band allocation information and the uplink transmission band allocation information).

Figure 7:
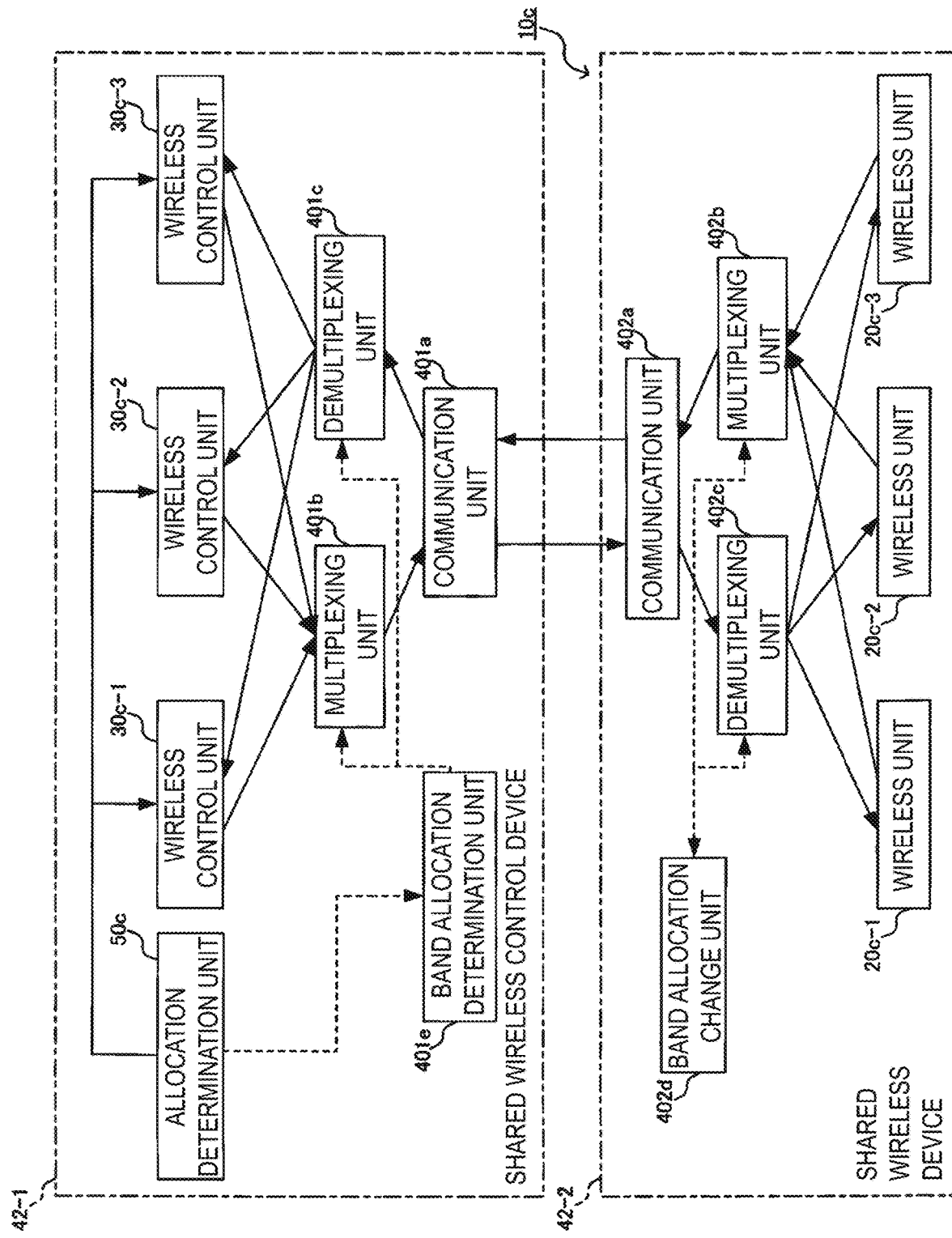
FIG. 7 is a diagram illustrating a configuration example of a multiplex transmission system according to a fourth embodiment.
Figure 8:
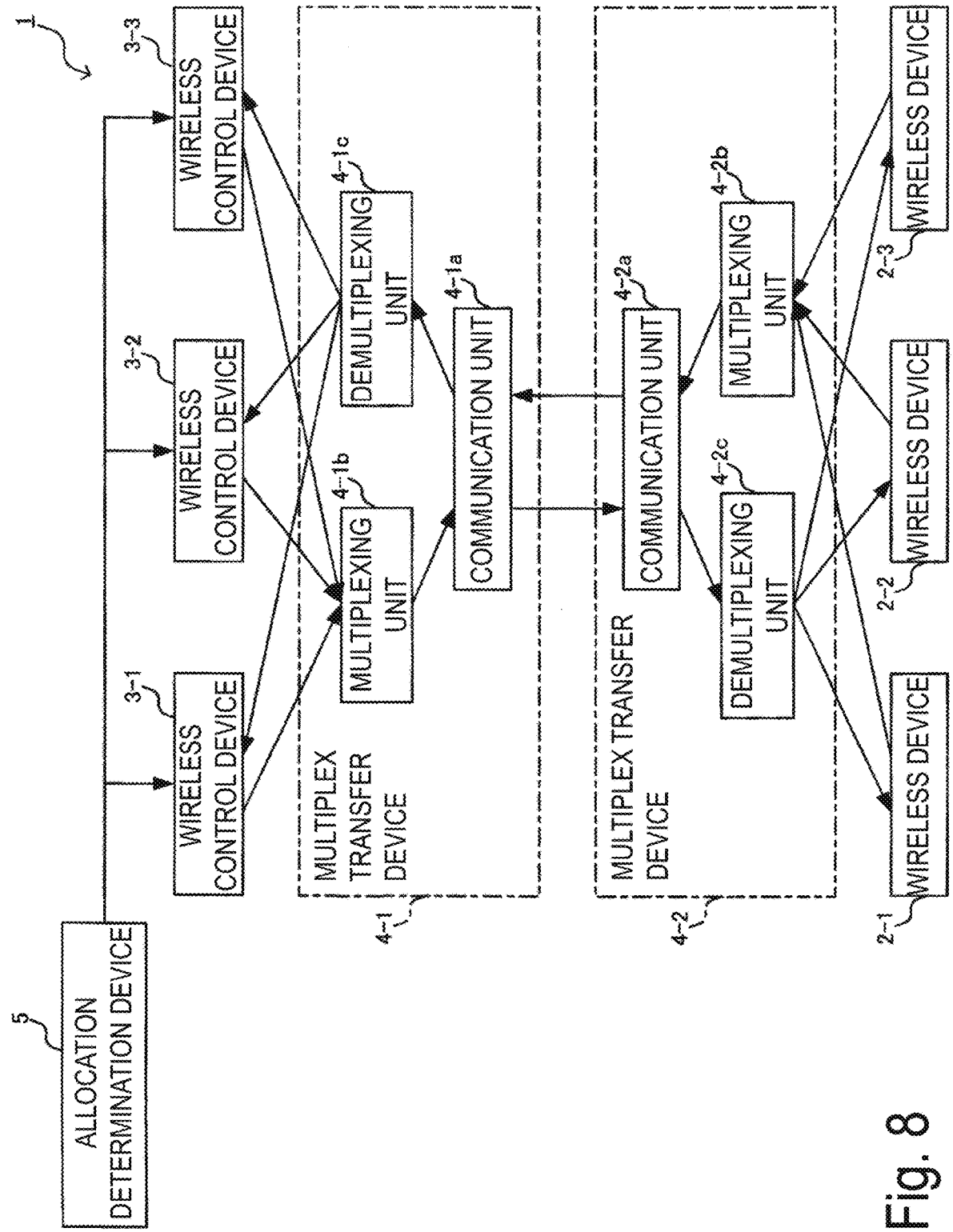
FIG. 8 is a diagram illustrating a configuration example of a multiplex transmission system.

FIG. 7 illustrates a configuration example of a multiplex transmission system 10c according to a fourth embodiment.

As illustrated in FIG. 7, the multiplex transmission system 10c has a shared wireless control device 42-1 and a shared wireless device 42-2. The multiplex transmission system 10c differs from the above-described embodiments in which the operators include different wireless control devices 30 and wireless devices 20, and each operator may use the shared wireless control device 42-1 and the shared wireless device 42-2.

The shared wireless control device 42-1 includes wireless control units 30c-1 to 30c-3, a communication unit 401a, a multiplexing unit 401b, a demultiplexing unit 401c, a band allocation determination unit 401e, and an allocation determination unit 50c.

The wireless control units 30c-1 to 30c-3 have the substantially the same functions as the above-mentioned wireless control devices 30-1 to 30-3 (see FIG. 1) except that the wireless control units 30c-1 to 30c-3 are provided in the shared wireless control device 42-1.

The allocation determination unit 50c has the substantially same functions as the functions of the above-mentioned allocation determination device 50 except that the allocation determination unit 50c is provided in the shared wireless control device 42-1. In other words, the shared wireless control device 42-1 includes the allocation determination unit 50c, thereby eliminating the need for the allocation determination device 50 that is an external device.

The shared wireless device 42-2 includes a communication unit 402a, a multiplexing unit 402b, a demultiplexing unit 402c, a band allocation change unit 402d, and wireless units 20c-1 to 20c-3.

The wireless units 20c-1 to 20c-3 have the substantially same functions as the functions of the above-mentioned wireless devices 20-1 to 20-3 except that the wireless units 20c-1 to 20c-3 are provided in the shared wireless device 42-2.

Note that the number of operators is not limited to three. In other words, the case of $x_1+x_2+ \ldots +x_n=B$ ($0 \leq x_i \leq B$, $1 \leq i \leq n$) has been described as a case where a plurality of operators offer services at the same time and location using different frequency bands, but the present invention is not limited thereto. Each of the above-described embodiments can also be applied to a case where a plurality of operators offer services at the same time and location using the same frequency band.

In addition, a case has been described in which $f_i(x_i)$ ($1 \leq i \leq n$) is a monotonically increasing function and the required MFH band increases as the frequency bandwidth widens, but the above-described embodiments are applicable to any function $f_i(x_i)$.

In this manner, the multiplex transmission systems 10, 10a, 10b, and 10c can efficiently change the transmission band allocated to each user based on the transmission band allocation information, efficiently utilizing the MFH band.

Note that the functions of the multiplex transmission systems 10, 10a, 10b, and 10c may be implemented by dedicated hardware, or may be implemented as a program on general-purpose hardware having functions of a computer including a CPU. That is, the multiplex transmission systems 10, 10a, 10b, and 10c according to the present invention can also be implemented by a computer and a program. The program can be recorded in a recording medium or provided via a network.

All of the above-described embodiments are illustrative of embodiments of the present invention, and are not meant to be limiting, and the present invention can be implemented in other various variations and modifications.

REFERENCE SIGNS LIST 10, 10a, 10b, 10c: Multiplex transmission system
20-1 to 20-3: Wireless device
20c-1 to 20c-3: Wireless unit
30-1 to 30-3: Wireless control device
30c-1 to 30c-3: Wireless control unit
40-1, 40-2, 40b-1: Multiplex transmission device
42-1: Shared wireless control device
42-2: Shared wireless device
50, 50b: Allocation determination device
50c: Allocation determination unit
100: Optical splitter
401a, 402a: Communication unit
401b, 402b: Multiplexing unit
401c, 402c: Demultiplexing unit
401d: Allocation information acquisition unit
402d: Band allocation change unit
401e: Band allocation determination unit
401f: Traffic collection unit
401g: Allocation change request unit

The invention claimed is:

1. A multiplex transmission system for multiplexing signals between a plurality of wireless devices configured to wirelessly communicate with wireless terminals with an available frequency bandwidth allocated to each of a plurality of users in a common frequency band with a plurality of wireless control devices that control the plurality of wireless devices for each of the plurality of users, and transmitting the multiplexed signal, the multiplex transmission system comprising:
   a band allocation determination unit configured to determine, based on allocation information indicating allocation of the frequency bandwidth available to each of the plurality of users, an uplink transmission band and a downlink transmission band to be allocated to each of the plurality of users, and output the uplink transmission band and the downlink transmission band as uplink transmission band allocation information and downlink transmission band allocation information, respectively;
   a first multiplexing unit configured to multiplex, based on the downlink transmission band allocation information, downlink signals and the uplink transmission band allocation information, the downlink signals being output from the plurality of wireless control devices toward the plurality of wireless devices for each of the plurality of users;
   a first communication unit configured to transmit the signal multiplexed by the first multiplexing unit toward the plurality of wireless devices and receive a multiplexed signal obtained by multiplexing signals output from the plurality of wireless devices toward the wireless control devices;
   a first demultiplexing unit configured to demultiplex the multiplexed signal received by the first communication unit into uplink signals for each of the plurality of users;
   a second communication unit configured to receive the multiplexed signal transmitted by the first communication unit and transmit the multiplexed signal output from the plurality of wireless devices toward the plurality of wireless control devices;
   a second demultiplexing unit configured to demultiplex the multiplexed signal received by the second communication unit into the downlink signals for each of the plurality of users and the uplink transmission band allocation information;
   a band allocation change unit configured to change, based on the uplink transmission band allocation information demultiplexed by the second demultiplexing unit, the uplink transmission band allocated to each of the plurality of users; and
   a second multiplexing unit configured to multiplex the uplink signals output from the plurality of wireless devices toward the plurality of wireless control devices for each of the plurality of users according to the uplink transmission band changed by the band allocation change unit.

2. The multiplex transmission system according to claim 1, wherein
   the first multiplexing unit and the second multiplexing unit are configured to multiplex signals by at least one of time multiplexing or wavelength multiplexing.

3. The multiplex transmission system according to claim 1, wherein
   the second communication unit, the second demultiplexing unit, the second multiplexing unit, and the band allocation change unit are provided for each of the plurality of users, and
   the plurality of second communication units are configured to communicate with the first communication unit via PON.

4. The multiplex transmission system according to any one of claim 1, further comprising:
   a traffic collection unit configured to collect traffic of uplink signals and downlink signals for each of the plurality of users; and
   an allocation change request unit configured to request an allocation determination device to change the frequency bandwidth allocated to each of the plurality of users, the allocation determination device being configured to determine, based on the traffic collected by the traffic collection unit, the available frequency bandwidth allocated to each of the plurality of users, wherein
   the band allocation determination unit is configured to determine, based on allocation information changed in response to the request from the allocation change request unit, the uplink transmission band and the downlink transmission band.

5. A multiplex transmission method for multiplexing signals between a plurality of wireless devices configured to wirelessly communicate with wireless terminals with an available frequency bandwidth allocated to each of a plurality of users in a common frequency band with a plurality of wireless control devices that control the plurality of wireless devices for each of the plurality of users, and transmitting the multiplexed signal, the method comprising:
   band application determining of, based on allocation information indicating allocation of the frequency bandwidth available to each of the plurality of users, determining an uplink transmission band and a downlink transmission band to be allocated to each of the plurality of users, and outputting the uplink transmission band and the downlink transmission band as uplink transmission band allocation information and downlink transmission band allocation information, respectively;

first multiplexing of, based on the downlink transmission band allocation information, multiplexing downlink signals and the uplink transmission band allocation information, the downlink signals being output from the plurality of wireless control devices toward the plurality of wireless devices for each of the plurality of users;

first demultiplexing of demultiplexing the signal multiplexed in the first multiplexing step into downlink signals for each of the plurality of users and the uplink transmission band allocation information;

band allocation changing of, based on the uplink transmission band allocation information demultiplexed in the first demultiplexing, changing the uplink transmission band allocated to each of the plurality of users;

second multiplexing of multiplexing the uplink signals output from the plurality of wireless devices toward the plurality of wireless control devices for each of the plurality of users according to the changed uplink transmission band; and second demultiplexing of demultiplexing the signal multiplexed into the uplink signals for each of the plurality of users in the second multiplexing.

\* \* \* \* \*